US012427072B2

(12) United States Patent
Stephen

(10) Patent No.: US 12,427,072 B2
(45) Date of Patent: Sep. 30, 2025

(54) WHEELCHAIR LIFT DEVICE AND USE THEREOF

(71) Applicant: Jeffrey Stephen, Victoria (CA)

(72) Inventor: Jeffrey Stephen, Victoria (CA)

( * ) Notice: Subject to any disclaimer, the term of this patent is extended or adjusted under 35 U.S.C. 154(b) by 379 days.

(21) Appl. No.: 18/022,120

(22) PCT Filed: Aug. 18, 2021

(86) PCT No.: PCT/CA2021/051146
§ 371 (c)(1),
(2) Date: Feb. 17, 2023

(87) PCT Pub. No.: WO2022/036451
PCT Pub. Date: Feb. 24, 2022

(65) Prior Publication Data

US 2023/0301857 A1 Sep. 28, 2023

(30) Foreign Application Priority Data

Aug. 19, 2020 (CA) ................................ CA 3090461

(51) Int. Cl.
*A61G 7/10* (2006.01)

(52) U.S. Cl.
CPC ......... *A61G 7/1046* (2013.01); *A61G 7/1001* (2013.01); *A61G 7/1074* (2013.01)

(58) Field of Classification Search
CPC .. A61G 7/1046; A61G 7/1074; A61G 7/1042; A61G 7/1001; A61G 7/1019; A61G 3/063
See application file for complete search history.

(56) References Cited

U.S. PATENT DOCUMENTS 2,757,756 A * 8/1956 Warry ........................ B66B 9/16 187/243
7,055,840 B1 6/2006 Kelso
7,165,778 B2 1/2007 Kuiken
8,534,422 B2 * 9/2013 Solhjem .................... E04G 1/24 182/141
9,333,132 B2 5/2016 Bruestle
9,675,508 B2 6/2017 Hall (Continued)

OTHER PUBLICATIONS

WIPO, Canadian International Searching Authority, International Search Report mailed Nov. 3, 2021, International Patent Application No. PCT/CA2021051146, 3 Pages.

(Continued)

*Primary Examiner* — Glenn F Myers
(74) *Attorney, Agent, or Firm* — Baumgartner Patent Law, LLC; Marc Baumgartner

(57) ABSTRACT

A system is provided for raising and lowering a wheelchair and user, the system comprising a handheld tool with a bit and a lift comprising: a framework, which includes a base, a top and a pair of sides; a pair of articulating legs mounted on the base; a carriage slidably engaged with the sides and including a grooved axle support which is configured to accept a wheelchair axle; a drivetrain in motive relation with the carriage; a gear box which is attached to the framework; a gear box gear which is housed in the gear box and is in motive relation with the drivetrain; and a spindle which is attached to the gear box gear, extends upward from the gear box and is configured to engage the bit of the handheld tool.

17 Claims, 15 Drawing Sheets

(56) References Cited

U.S. PATENT DOCUMENTS

| | | | | |
|---|---|---|---|---|
| 9,808,388 | B2 | 11/2017 | Powell | |
| 9,980,865 | B2 | 5/2018 | Miranda | |
| 10,597,274 | B1 * | 3/2020 | Busuttil | B66F 11/04 |
| 2006/0070817 | A1 * | 4/2006 | Campbell | E04G 1/22<br>187/238 |
| 2006/0182581 | A1 * | 8/2006 | Murray | B66B 9/0869<br>414/541 |
| 2018/0055040 | A1 * | 3/2018 | Abouelmakarem | A61G 5/104 |
| 2019/0176780 | A1 * | 6/2019 | Gillin | B60S 9/04 |
| 2019/0322502 | A1 | 10/2019 | Lykkegaard | |
| 2020/0113757 | A1 | 4/2020 | Abdullah | |
| 2020/0335959 | A1 * | 10/2020 | Gibel | B66C 1/68 |

OTHER PUBLICATIONS

WIPO, Canadian International Searching Authority, Written Opinion of the International Searching Authority mailed Nov. 3, 2021, International Patent Application No. PCT/CA2021051146, 4 Pages.

* cited by examiner

WHEELCHAIR LIFT DEVICE AND USE THEREOF

CROSS REFERENCE TO RELATED APPLICATIONS

The present invention is filed under 35 U.S.C. § 371 as the U.S. national phase of International Application No. PCT/CA2021/051146, filed Aug. 18, 2021, which designated the U.S. and claims the benefit of Canadian Patent Application Serial No. 3090461, filed on Aug. 19, 2020, and entitled "WHEELCHAIR LIFT DEVICE AND USE THEREOF", each of which is hereby incorporated in their entirety including all tables, figures, and claims.

FIELD

The present technology is an easy to use lift mechanism for use with a wheelchair. More specifically, it is a lifting device that is foldable and can be deployed and used by a user while remaining in their wheelchair.

BACKGROUND

U.S. Pat. No. 9,333,132 discloses a wheelchair lift system that allows a wheelchair and a person sitting in the wheelchair to be selectively positioned at a standing height or a sitting height. A lift system that is attachable to wide variety of existing wheelchairs. The lift mechanism is designed to remain attached to the wheelchair and includes a hydraulically or pneumatically actuated ram, or a screw drive. The lift mechanism cannot be attached and detached from the wheelchair without the use of tools by a third party or while the user is not in the wheelchair. The lift mechanism adds weight to the wheelchair. The maximum height is that of the user in a standing position.

U.S. Pat. No. 9,980,865 discloses an elevating wheelchair. The wheelchair may have a gas cylinder disposed between the seat of the wheelchair and the frame of the wheelchair. By engaging the gas cylinder and pressing against an assistive push bar, the user may translate the seat along at least a portion of a seat travel path, elevating the seat of the wheelchair. The lift mechanism is a permanent attachment to the wheelchair and adds weight to the wheelchair. The lift mechanism's utility is limited by the weight that it can lift. The lift mechanism will fail when the gas cylinder is emptied. As the gas in the cylinder is used to safely lower the user, an empty cylinder could leave a user stranded in the raised position.

U.S. Pat. No. 9,808,388 discloses a self or assist-operated lift apparatus. In various embodiments, the lift apparatus includes a vertical rail; a linear bearing positioned to be moved along the vertical rail; a drive mechanism coupled to the linear bearing and configured to move the linear bearing at a controlled rate along the vertical bearing between a first position at a lower end of a range of motion and a second position at an upper end of the range of motion; and a seat attached to the linear bearing, the seat being constructed at least in part of a substantially rigid material and having a size and shape suitable to accommodate a seated human occupant. The lift mechanism is not designed for use with a wheelchair.

U.S. Pat. No. 9,675,508 discloses an apparatus for raising and lowering a payload, particularly a chair and its user to provide assistance with the sit-to-stand task. The apparatus comprises a base, a platform, linkages attached between base and platform to allow only vertical motion therebetween, an inflatable bag also situated between base and platform, and a source of pressurized fluid such as compressed air, whereby the bag is inflated and deflated to raise and lower the platform. The user may use an existing, favorite chair, including a reclining chair, which is placed upon the platform without modification. In a low position, the platform is quite close to the floor, providing comfort during sitting. In a high position, the platform is greatly elevated, to provide a full measure of sit-to-stand assistance. The apparatus is complex and while it is stated that it is movable, a user would not be able to move it without assistance. The lift mechanism is not designed for use with a wheelchair.

U.S. Pat. No. 7,165,778 discloses a manually operable standing wheelchair includes an actuator for moving an occupant from a sitting position to a standing position. The manually operable standing wheelchair has a lifting mechanism including a ratchet, cable, pulley, and telescopic tubes, which the occupant may manually operate to shift from the sitting position to the standing position. There is also a drive system to enable the occupant to manually move himself or herself in and the wheelchair from the sitting position to the standing position, or in any position in between. The drive system may include adjustable lever drive arms with friction pads adapted for allowing the occupant to move in any position. The wheelchair is equipped with a set of spring-loaded anti-tip wheels that automatically deploy when the manual wheelchair begins to lift from the sitting position to the standing position. The apparatus does not raise a user in a wheelchair.

U.S. Pat. No. 7,055,840 discloses a wheelchair that enables its occupant to lower and raise their self to and from the surface on which the wheelchair is resting so that the occupant may enter the wheelchair from the surface without the aid of another person, the wheelchair a lower support frame, a seat frame assembly vertically movable relative to the lower support frame, a lifting assembly connected to the lower support frame and to the seat frame assembly, a planar ramp rotatably connected to the seat frame, the planar ramp rotating to form an inclined plane relative to the plane of the seat frame, the planar ramp rotating to a vertical position relative to the horizontal seat beneath the horizontal seat when the seat frame assembly is at its highest vertical position, and a footrest rotatably, the footrest rotating to a horizontal position when the seat frame assembly is at its highest vertical position, the footrest rotating downward beneath the ramp when the seat frame assembly is at its lowest vertical position. The wheelchair has a lowering mechanism and not a raising mechanism.

United States Patent Application Publication No. 20200113757 discloses a wheelchair lift apparatus for assisted wheelchair loading and unloading includes a base frame having a front end, a rear end, a left side, and a right side. A plurality of wheels is coupled to the base frame. A vertical frame is perpendicularly coupled to the rear end of the base frame. A lift track is coupled to the vertical frame. A lift car is coupled to the lift track and has a track engagement portion and a perpendicular platform. The track engagement portion is slidably engageable with the lift track. A seat is coupled to the perpendicular platform. A lift bracket is coupled to the rear end of the base frame. A lift mechanism is coupled to the lift bracket and is in operational communication with the lift car to move the lift car to and from a lowered position and an alternate raised position. This does not raise the wheelchair.

United States Patent Application Publication No. 20190322502 discloses a scissors lift comprising a bottom frame, a top frame and a scissors mechanism arranged between said bottom frame and said top frame to displace said bottom frame and said top frame relative to each other by transfer of an actuation force. The scissors mechanism comprises a central hollow scissors arm delimited between opposite scissors arm surfaces, wherein said central hollow scissors arm has a bottom pivotal connection connecting it to said bottom frame and a top pivotal connection connecting it to said top frame. Further, the mechanism comprises two passive scissors arms being pivotally connected to said bottom frame and pivotally connected to said top frame. Each of said two passive scissors arms are pivotally connected to said central hollow scissors arm on said opposite scissors arm surfaces of said central hollow scissors arm. Further, the scissors lift comprises a motor providing said actuation force, said motor located between said opposite scissors arm surfaces of said central hollow scissors arm. Thereby, the motor may be protected and at least partially enclosed by the scissors lift and even by the central hollow scissors arm, allowing a safer and/or more easily maintained scissors lift. Scissor lifts require large motors and therefore the apparatus would be difficult to move around. A user would need assistance in placing and using the scissor lift.

What is needed is a lift device that a user in a wheelchair can deploy without assistance or leaving their chair. It would be preferable if the lift device could be foldable for storage. It would be further preferable if the lift device could lift the wheelchair to at least 36 inches and high enough for the user to reach the ceiling of a home. It would be most preferable if the lift device could be raised and lowered over a wide range of speeds. It would be further preferable if the lift device was actuated by a handheld power tool. It would be further preferable if the lift device could also be actuated using a handheld wrench such that no electromotive power was required.

SUMMARY

The present technology is a lift device that a user in a wheelchair can deploy without assistance or leaving their chair. The lift device can be foldable for storage and can be carried under the user's wheelchair. The lift device can lift the wheelchair to at least 36 inches and high enough for the user to reach the ceiling. The lift device can be raised and lowered over a wide range of speeds. The lift device is actuated by a handheld power tool. The lift device can also be actuated using a handheld wrench such that no electromotive power is required.

In one embodiment, a wheelchair lift is provided for use with a handheld power tool, the wheelchair lift comprising: a framework, which includes a base, a top and a pair of sides; a pair of articulating legs mounted on the base; a carriage slidably engaged with the sides and including a grooved axle support which is configured to accept a wheelchair axle; a drivetrain in motive relation with the carriage; a gear box which is attached to the framework; a gear box gear which is housed in the gear box and is in motive relation with the drivetrain; and a spindle which is attached to the gear box gear, extends outward from the gear box and is configured to engage with a bit of the handheld tool.

In the wheelchair lift, the sides may include guide and the carriage may include a plurality of rollers that engage the guides.

In the wheelchair lift, the guides may be V-groove guides and the plurality of rollers may be a plurality of sheaves that engage the V-groove guides.

In the wheelchair lift, the drivetrain may include a plurality of chains, an upper idler sprocket on an upper idler axle, a middle driver sprocket on a driver axle which is in motive relation with the gear box gear and a lower idler sprocket on a lower idler axle.

In the wheelchair lift, the carriage may be rotatably mounted on the lower idler axle and may be moveable from a horizontal working position to a vertical storage position.

In the wheelchair lift, the spindle may include a hexagonal proximal end.

The wheelchair lift may further comprise a locking mechanism on the carriage, which is configured to lock the carriage to a wheelchair axle.

In another embodiment, a system is provided for raising and lowering a wheelchair and user, the system comprising a handheld tool with a bit and a lift comprising: a framework, which includes a base, a top and a pair of sides; a pair of articulating legs mounted on the base; a carriage slidably engaged with the sides and including a grooved axle support which is configured to accept a wheelchair axle; a drivetrain in motive relation with the carriage; a gear box which is attached to the framework; a gear box gear which is housed in the gear box and is in motive relation with the drivetrain; and a spindle which is attached to the gear box gear, extends upward from the gear box and is configured to engage the bit of the handheld tool.

In the system, the handheld tool may be a power drill.

In the system, the handheld power drill may be cordless.

In the system, the handheld tool may be a socket wrench.

In the system, the sides may include V-groove guides and the carriage may include a plurality of sheaves that engage the V-groove guides.

In the system, the drivetrain may include a plurality of chains, an upper idler sprocket on an upper idler axle, a middle driver sprocket on a driver axle which is in motive relation with a gear in the gear box and a lower idler sprocket on a lower idler axle.

In the system, the carriage may be rotatably mounted on the lower idler axle and may be moveable from a horizontal working position to a vertical storage position.

In the system, the spindle may include a hexagonal proximal end.

The system may further comprise a locking mechanism on the carriage, which is configured to lock the carriage to a wheelchair axle.

In another embodiment, a method of a user in a wheelchair autonomously raising and lowering the wheelchair from a ground position is provided, the method comprising: the user selecting a system for raising and lowering the wheelchair, the system comprising a lifting device and a hand tool with a rotating bit; the user positioning the wheelchair over the lifting device; the user engaging the bit of the hand tool with the lifting device; the user actuating the lifting device with the hand tool by rotating the bit; the lifting device engaging an axle of the wheelchair and raising the wheelchair; the user stopping the lifting device at a raised position by stopping the rotation of the bit; the user lowering the wheelchair to the ground position by actuating the lifting device with the hand tool by counter rotating the bit, thereby autonomously raising and lowering the wheelchair.

The method may further comprise the user locking the wheelchair to the lifting device prior to raising the wheelchair.

In the method, the actuating may be effected by a power handheld tool.

In the method, the actuating may be effected by a cordless drill.

The method may further comprise the user releasing the wheelchair from the lifting device by unlocking the wheelchair from the lifting device once it has returned to the ground position.

The method may further comprise the user folding the lifting device for transport or storage.

In the method, the raising and lowering may be at a variable speed.

FIGURES

Figure 8A:
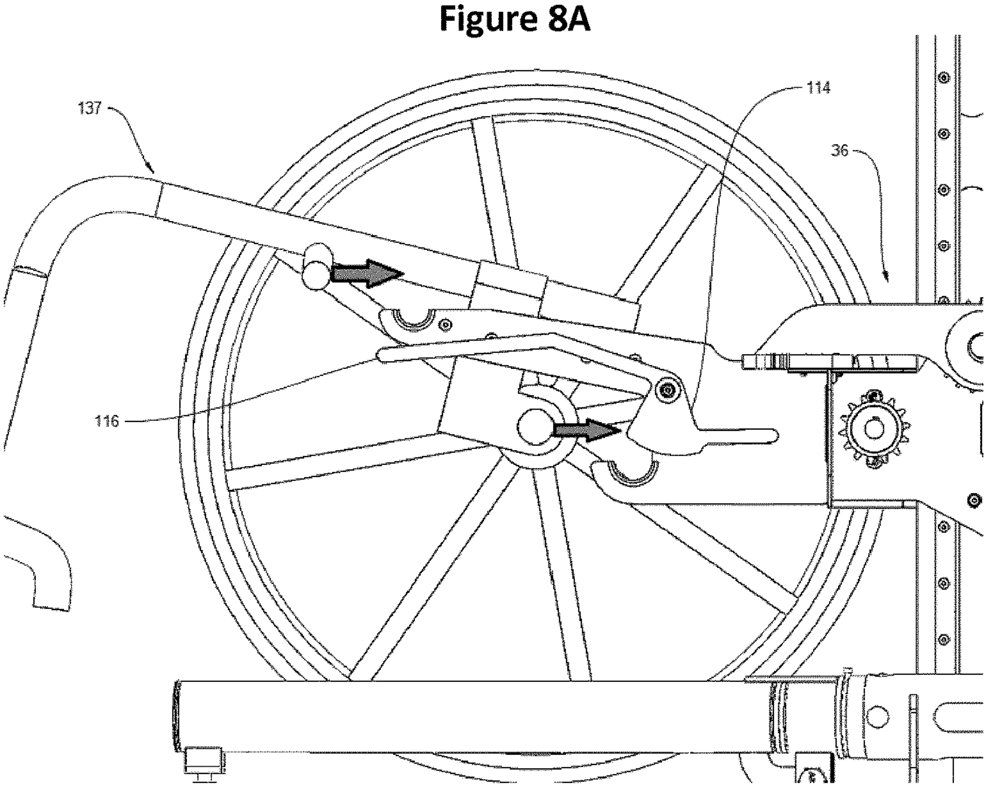
FIG. 8A is a side view showing the wheelchair backing into the lift device of FIG. 1.
Figure 8B:
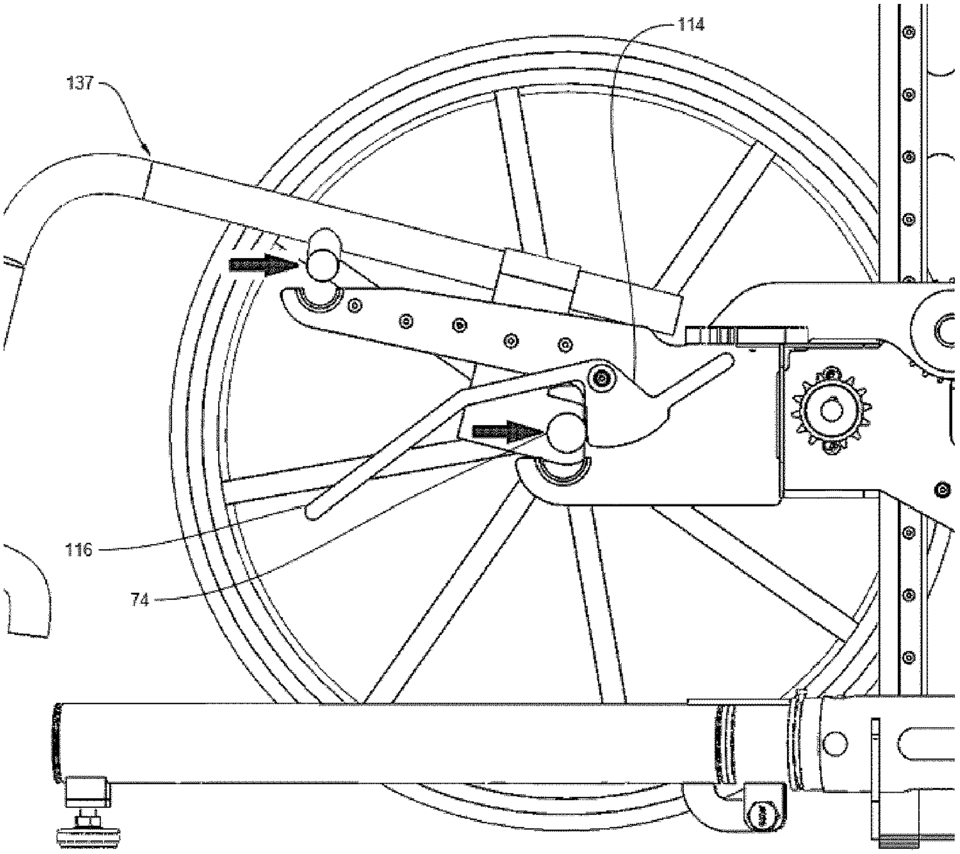
FIG. 8B is a side view showing the wheelchair located in the ready to lock position.
Figure 8C:
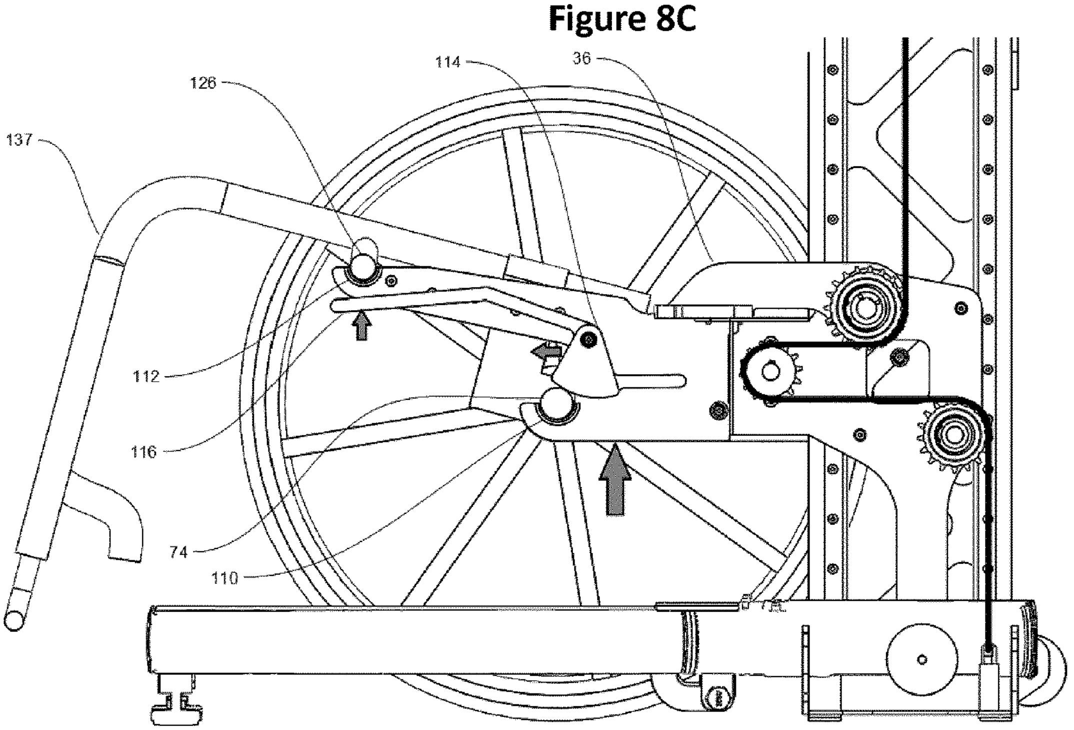
Figure 8D:
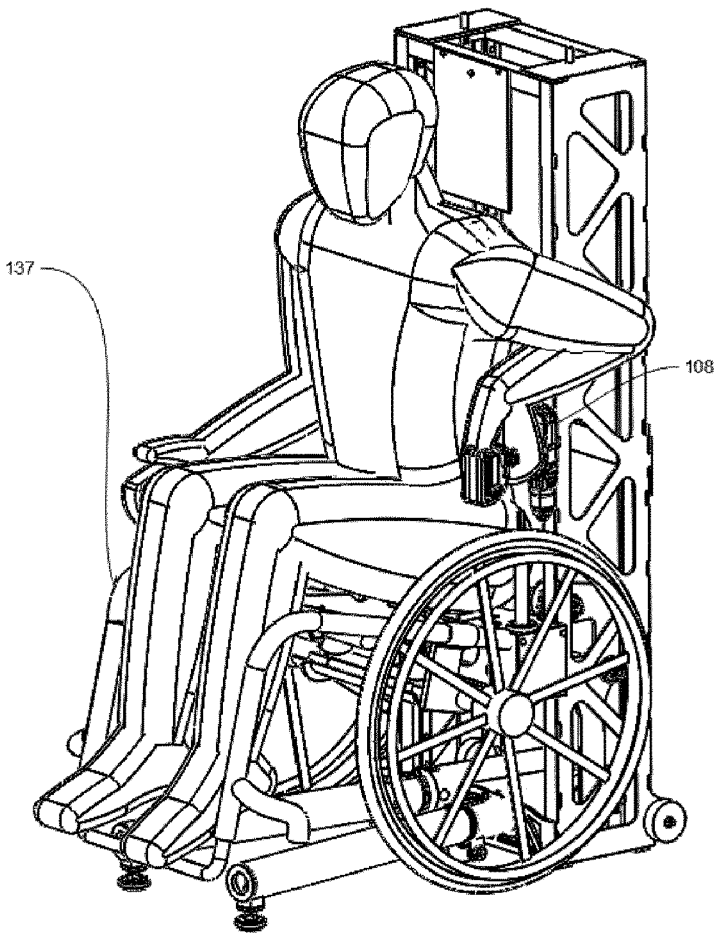
Figure 8E:
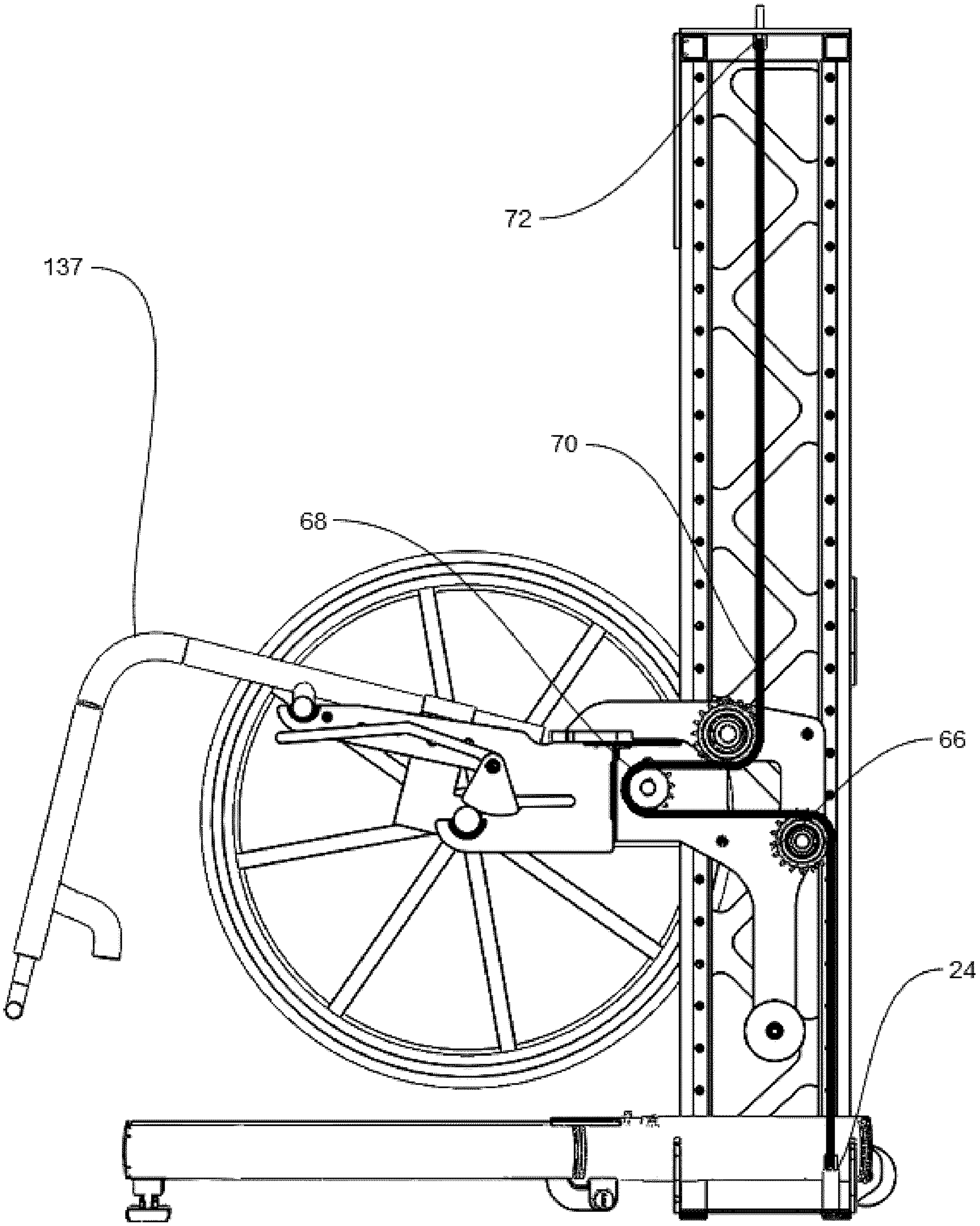
Figure 8F:
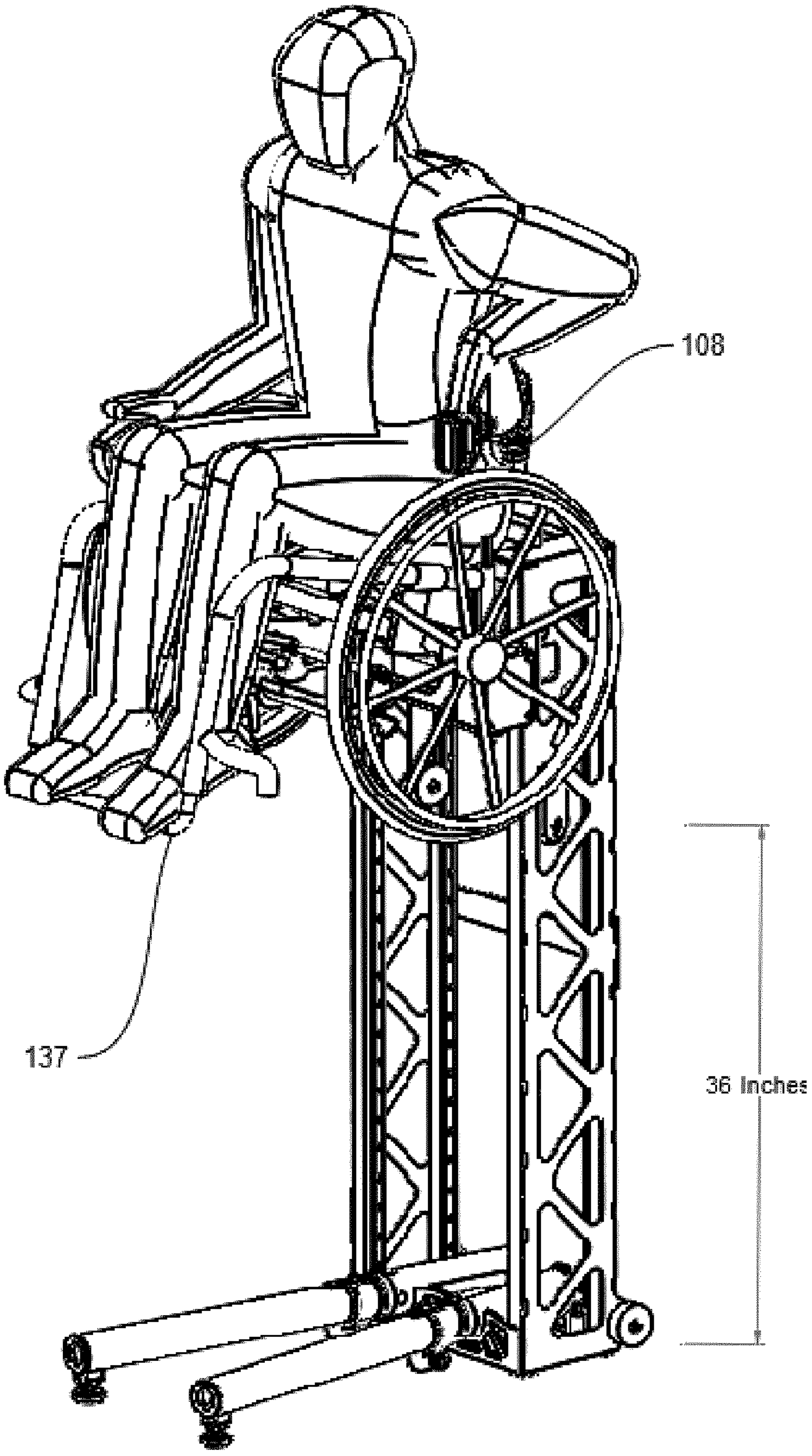
Figure 8G:
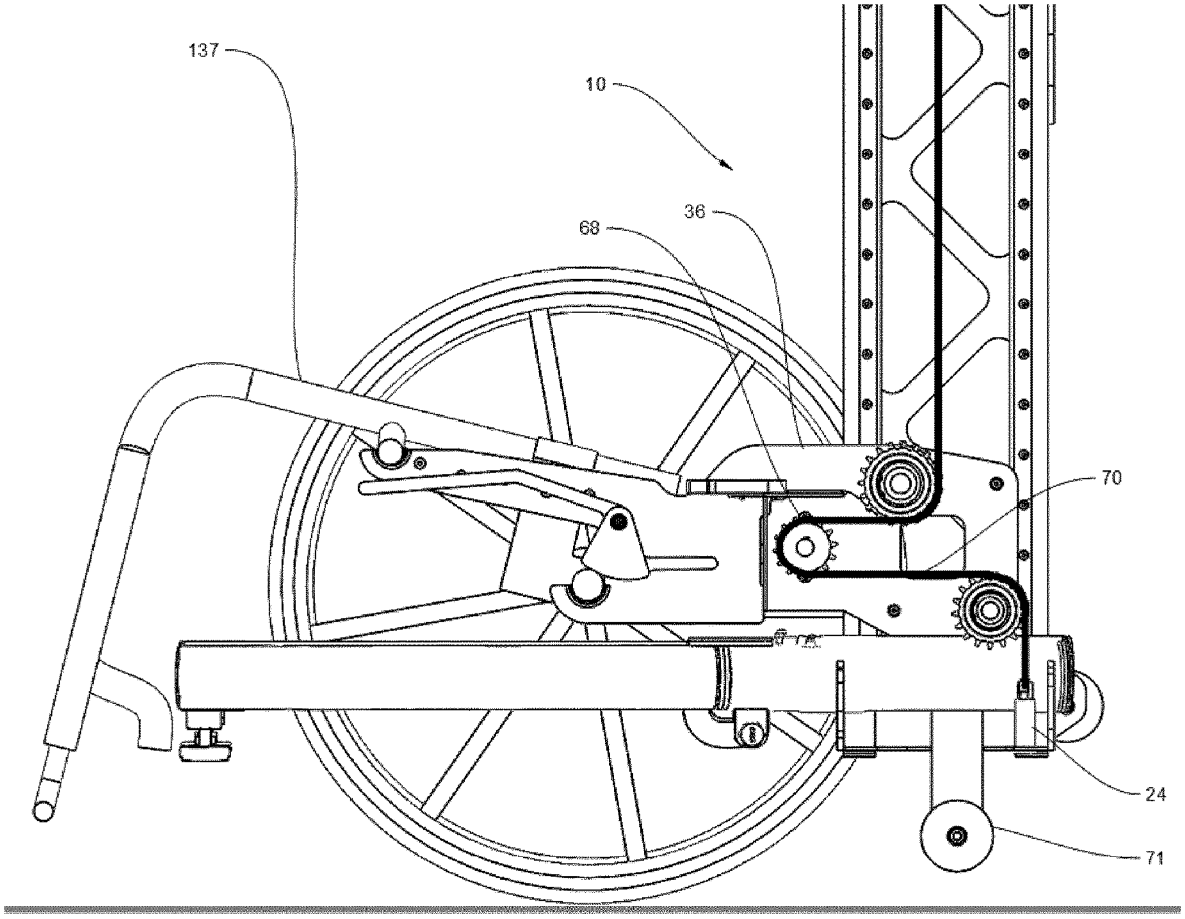

FIG. 8C is a side view of the wheelchair locked to the lift device; FIG. 8D shows a user in the wheelchair, which is in the locked position, applying a motive force with a handheld electric drill; FIG. 8E is a side view of the wheelchair raised above the ground;

FIG. 8F shows a user in the wheelchair in the raised position; FIG. 8G is a side view of the lift device stowed under the wheelchair.

Figure 9A:
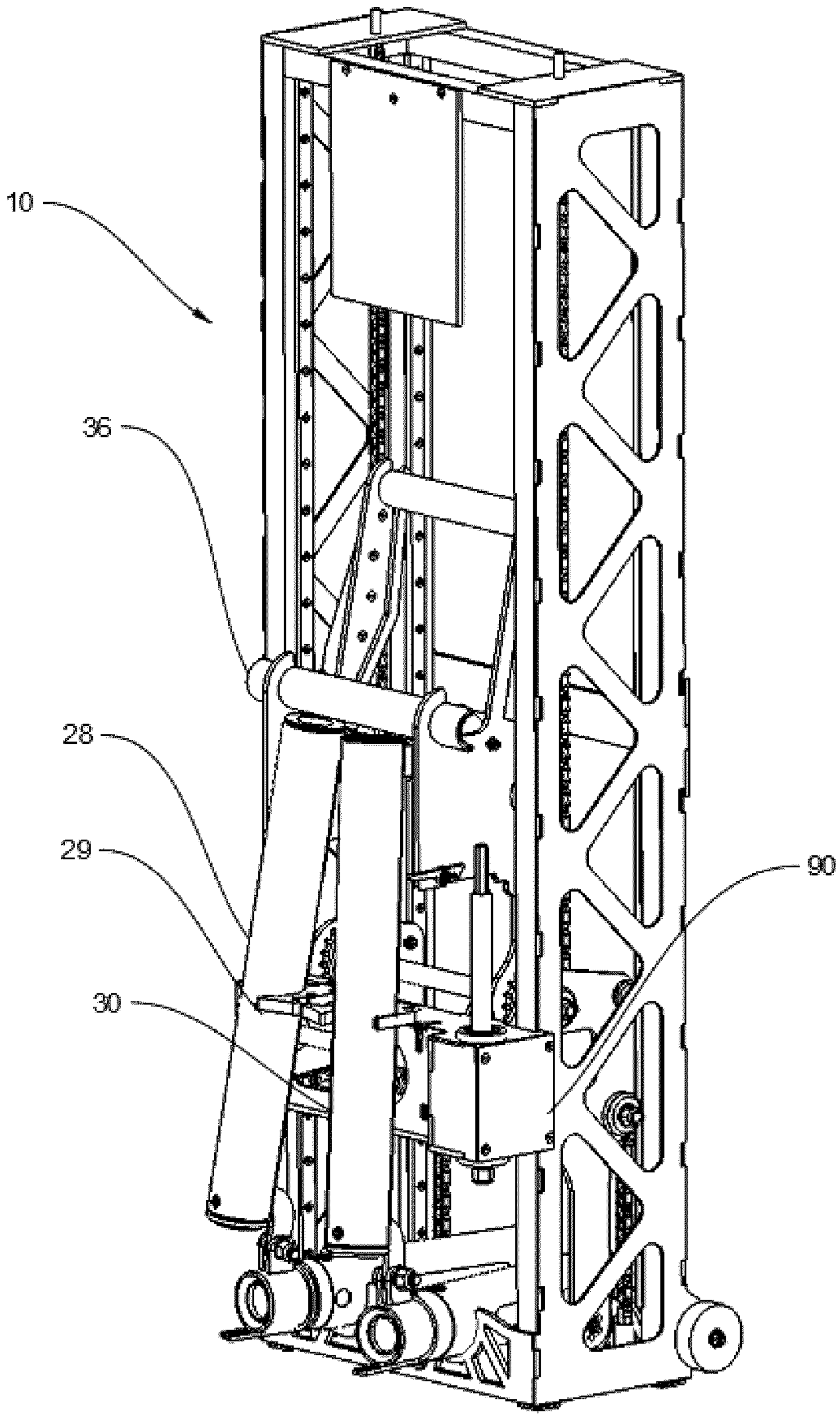
Figure 9B:
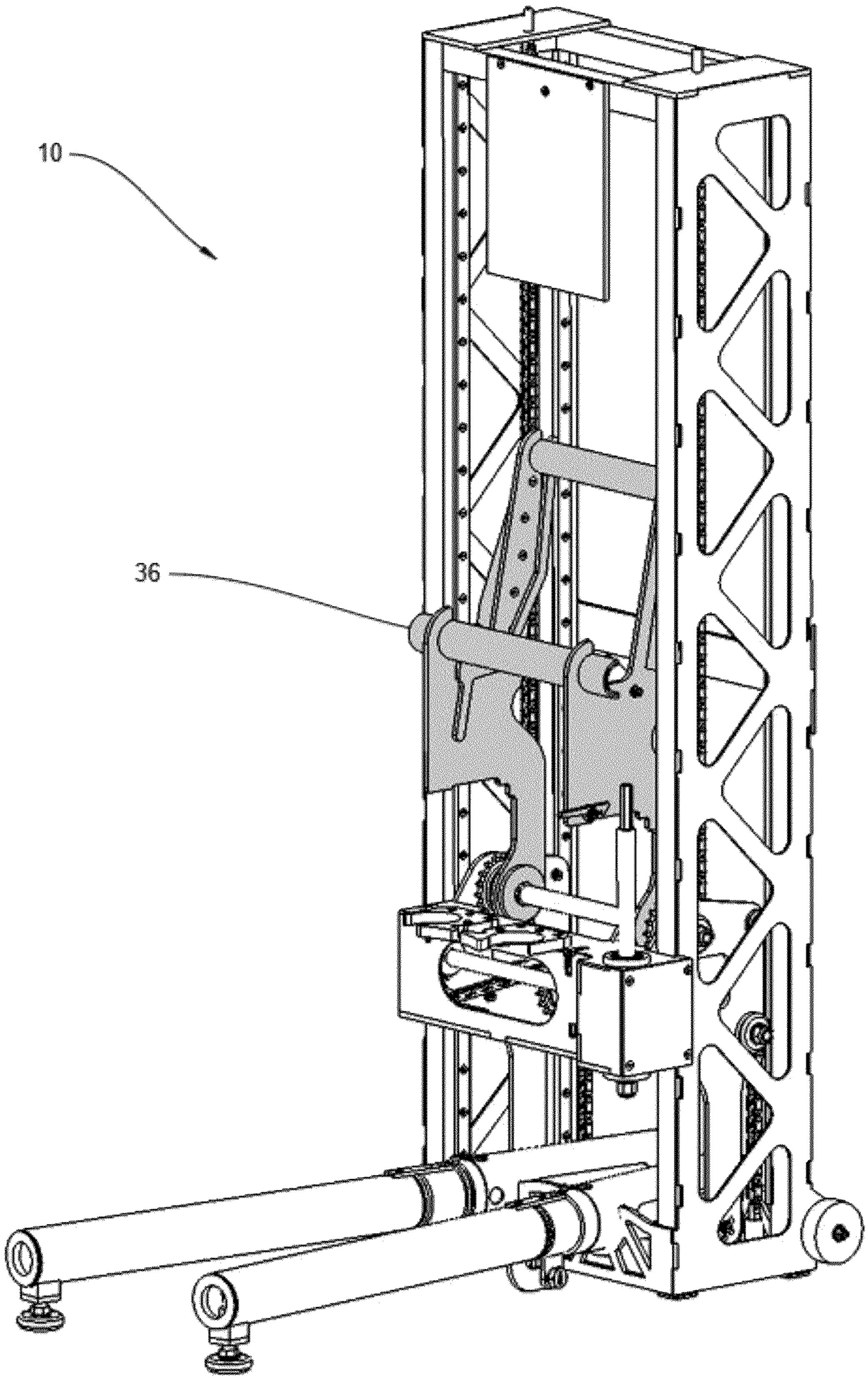

FIG. 9A is a perspective view of the lift device in the position to be moved by tilting the device onto the caster wheels in preparation for storage; and FIG. 9B is a perspective view of the lift device in its storage position.

Figure 10A:
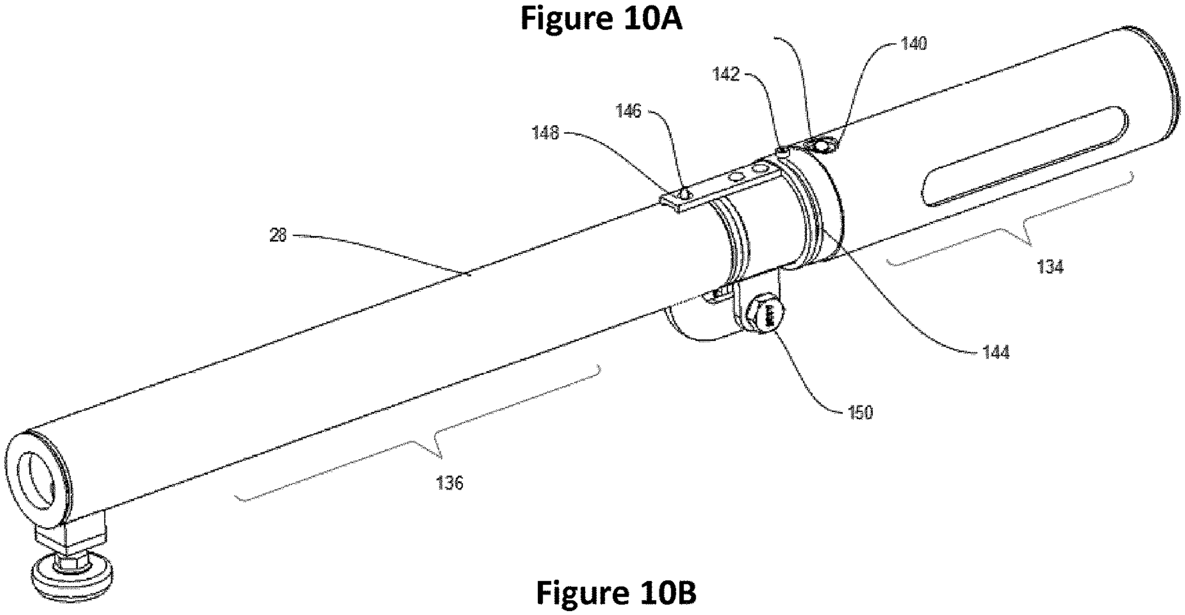
Figure 10B:
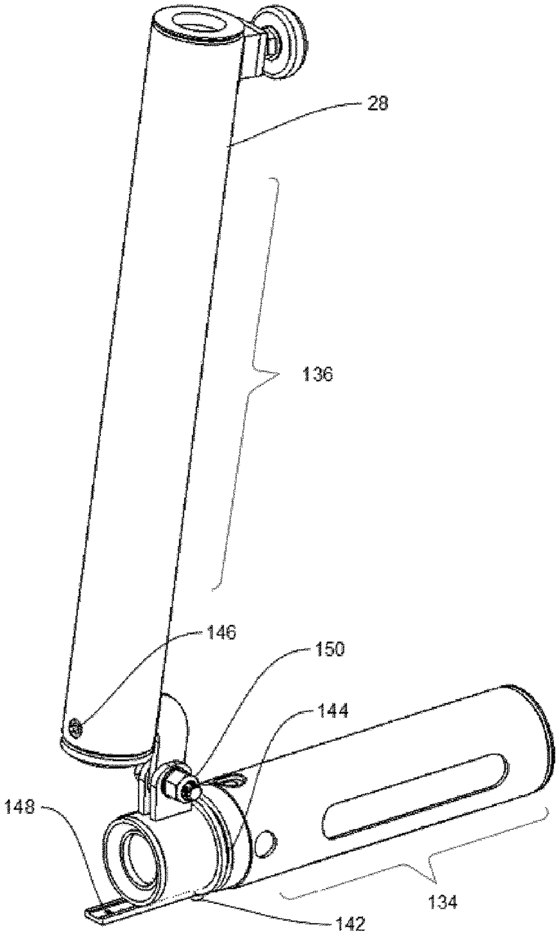

FIG. 10A is a top perspective view of a leg in the operational position; and FIG. 10B is a top perspective view of the leg in the storage position.

Figure 11A:
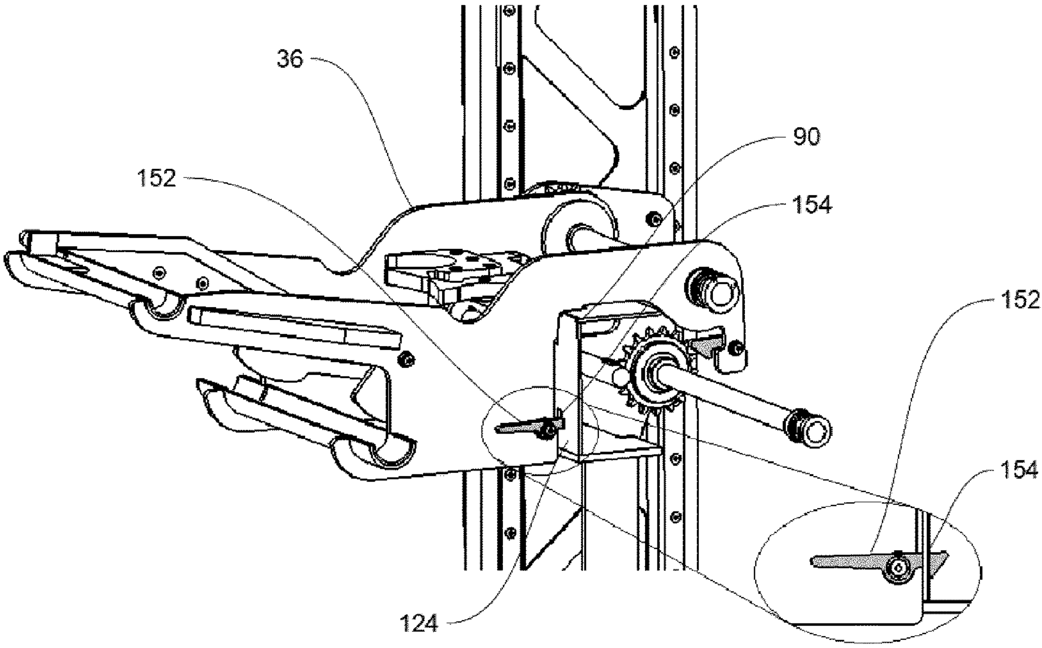

FIG. 11A is a close-up perspective view of the gearbox and carriage in an operational position with the left frame of the lift device removed.

Figure 11B:
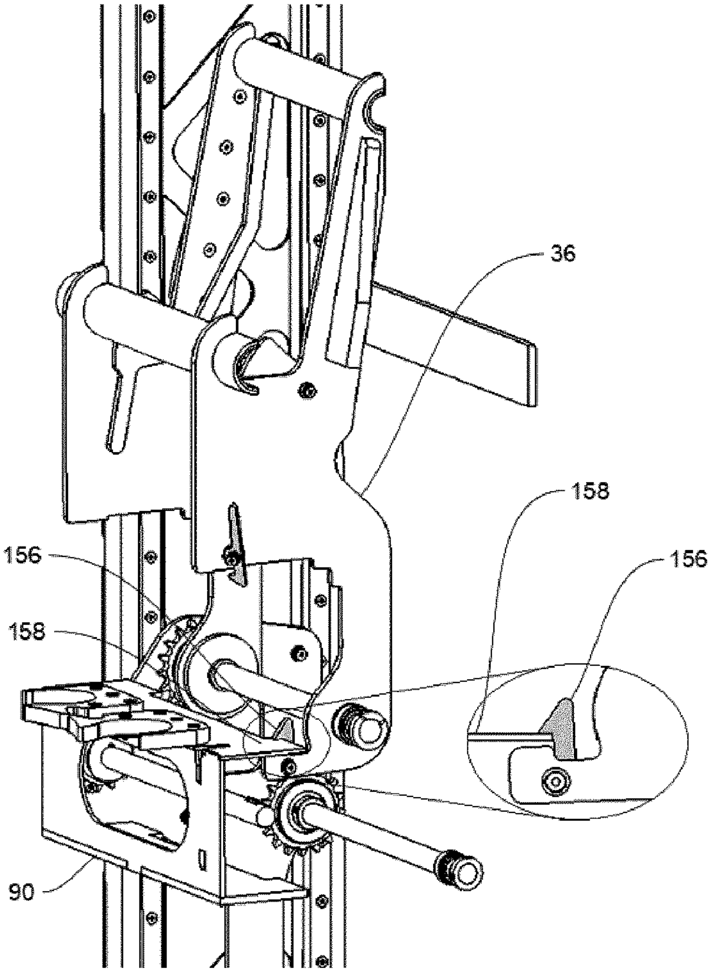

FIG. 11B is a close-up perspective view of the gearbox and carriage in a storage position with the left frame of the lift device removed.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
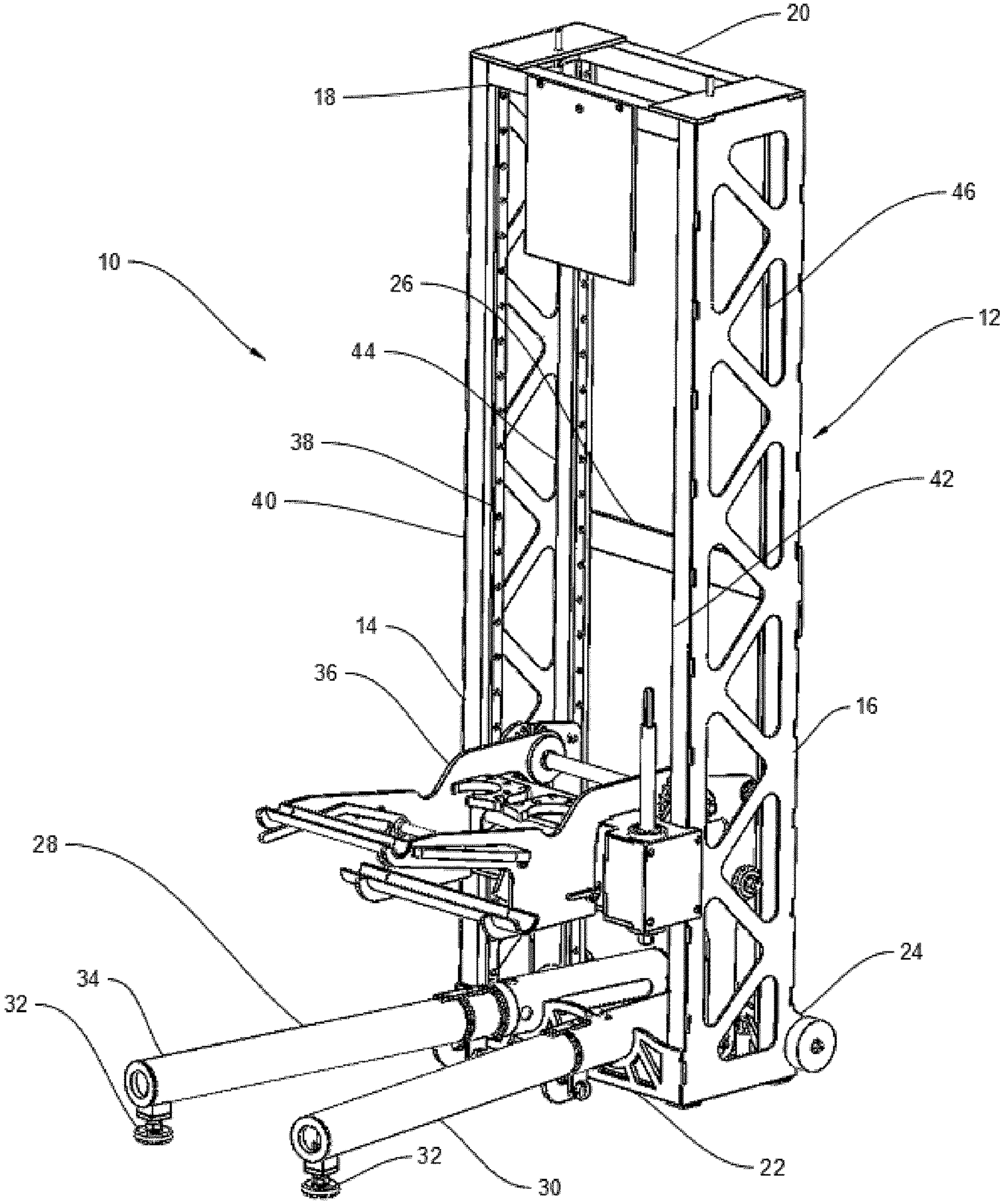
FIG. 1 is a perspective view of the lift device of the present technology.

A wheelchair lift device, generally referred to as 10, is shown in FIG. 1. The lift device 10 includes a framework, generally referred to as 12, consisting of two sides 14, 16, a front top member 18, a rear top member 20, a base front member 22 and a base rear member 24. A horizontal member 26 extends between the sides. Two articulating legs 28, 30 are attached to the base front member 22 and the base back member 24 and extend outward therefrom. Feet 32 are located at or proximate the distal end 34 of each leg 28, 30. A carriage 36 is indirectly mounted on the framework 12, via a V-groove guide 38 on the front right vertical member 40, the front left vertical member 42, the rear right vertical member 44 and the rear left vertical member 46 of the framework 12.

Figure 2:
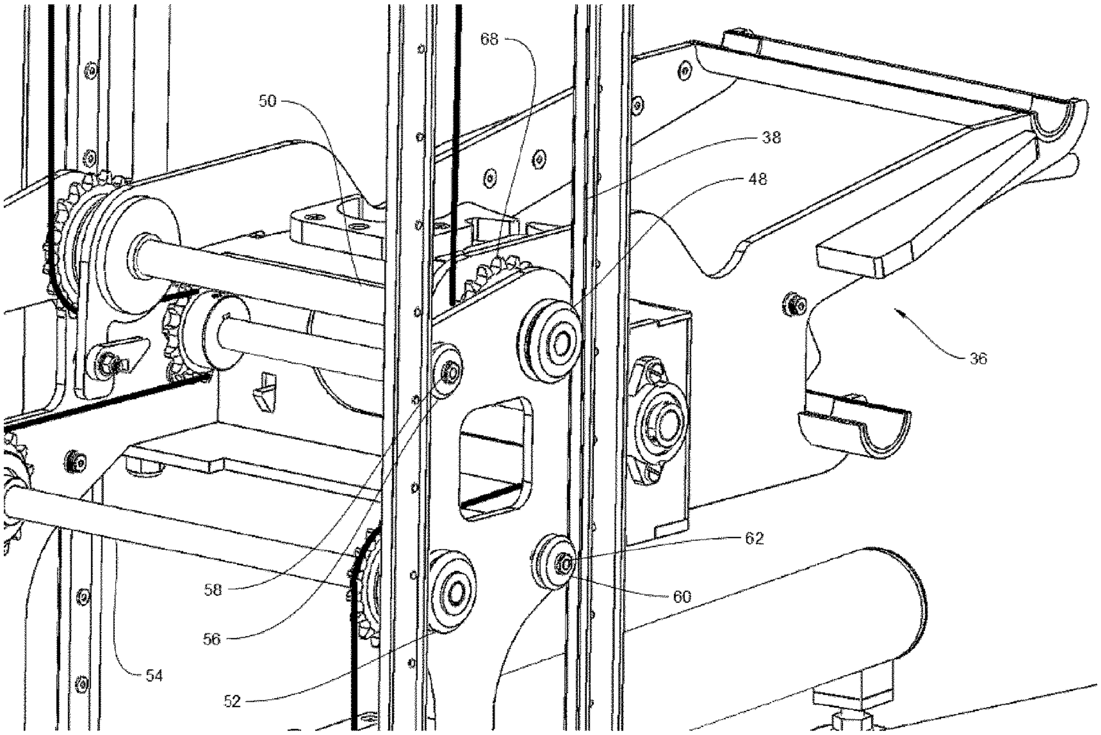
FIG. 2 is a close-up rear view of the drivetrain of the lift device of FIG. 1.

FIG. 2 shows how the carriage 36 is mounted on the V-groove guides 38. There are eight sheaves: two large front upper sheaves 48 mounted on an upper idler axle 50; two large back lower sheaves 52 mounted on a lower idler axle 54; two small rear upper sheaves 56 mounted on a drive shaft 58; and two small front lower sheaves 60 mounted on a lower shaft 62. The two larger diameter sheaves 48, 52 counteract the moment forward caused by the weight of the user/wheelchair. The two smaller sheaves 56, 60 are light duty and are engaged when the lift device 10 is tucked up underneath the user for transportation of the device 10. This transportation configuration would cause a backward moment due to the device 10 being suspended in the air.

Figure 3:
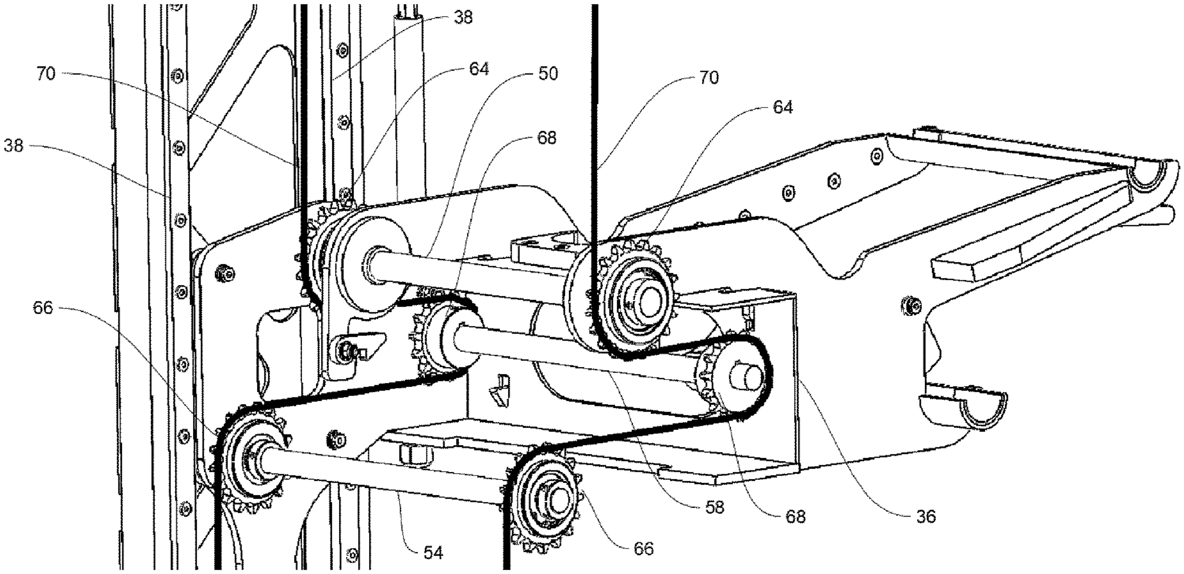
FIG. 3 is a close-up rear view of the drivetrain with the left frame removed.

As shown in FIG. 3, there are three sets of matching sprockets: an upper pair of idler sprockets 64 mounted on the upper idler axle 50; a lower pair of idler sprockets 66 mounted on the lower idler axle 54; and a middle pair of driver sprockets 68 mounted on the drive shaft 58. The middle pair of driver sprockets 68 are mounted on the drive shaft 58 such that torque from the drive shaft 58 will be applied to the driver sprockets 68, drawing the chain 70 towards the driver sprockets 68 and the carriage 36 is drawn upwards along the V-groove guides 38.

Figure 4:
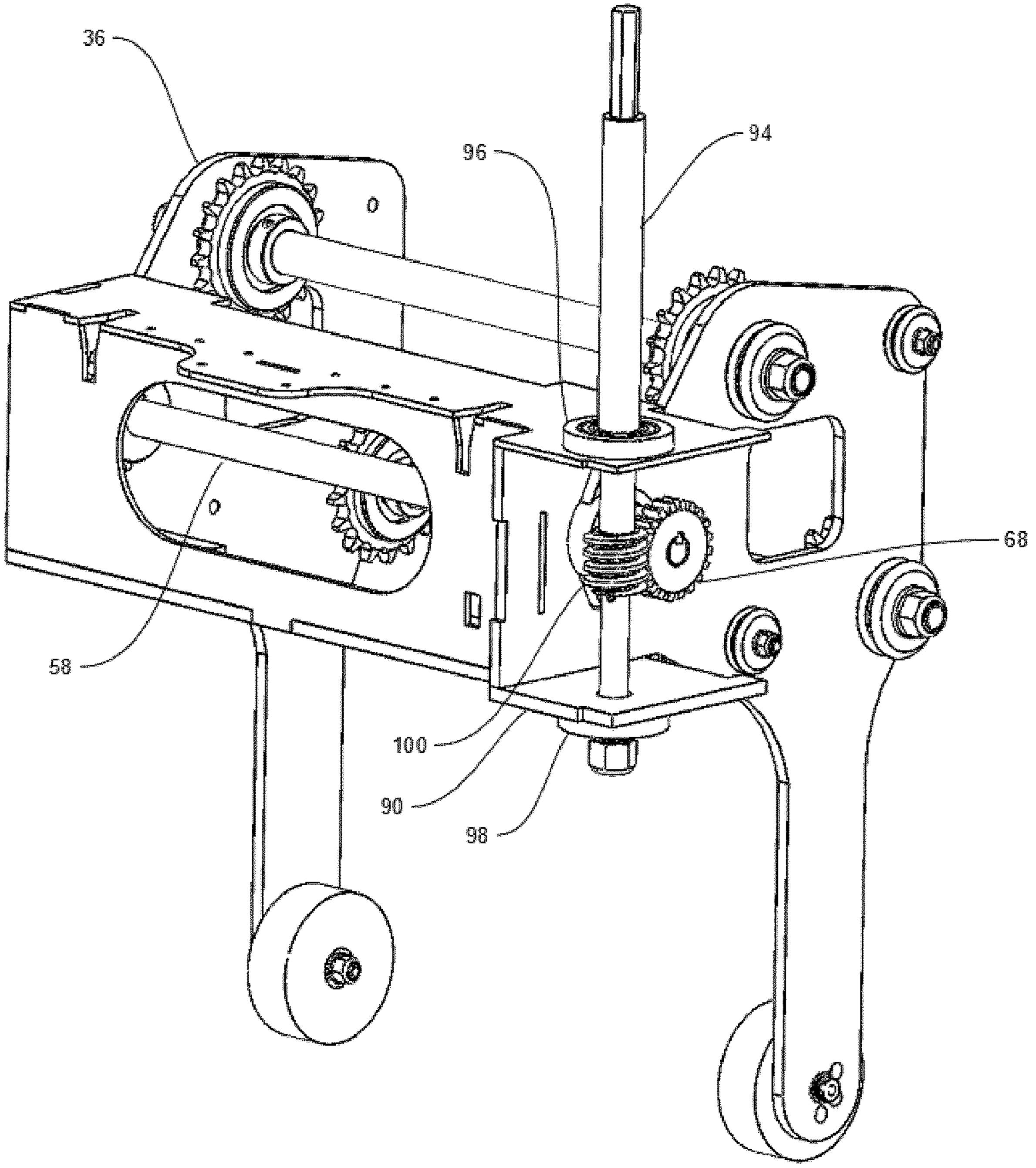
FIG. 4 is a front perspective view of the gearbox of the lift device of FIG. 1.

As shown in FIG. 4 a gear box 90 is located on the carriage. The gear box 90 retains the driver sprockets 68 which is mounted on the drive shaft 58. A spindle 94 extends outward from the gear box 90 and is rotatably mounted on the gear box 90. Bearings 96 and bearings 98 ensure smooth rotation of the spindle 94. A gear 100 on the spindle 94 meshes with the driver sprocket 68 in the gear box 90.

Figure 5:
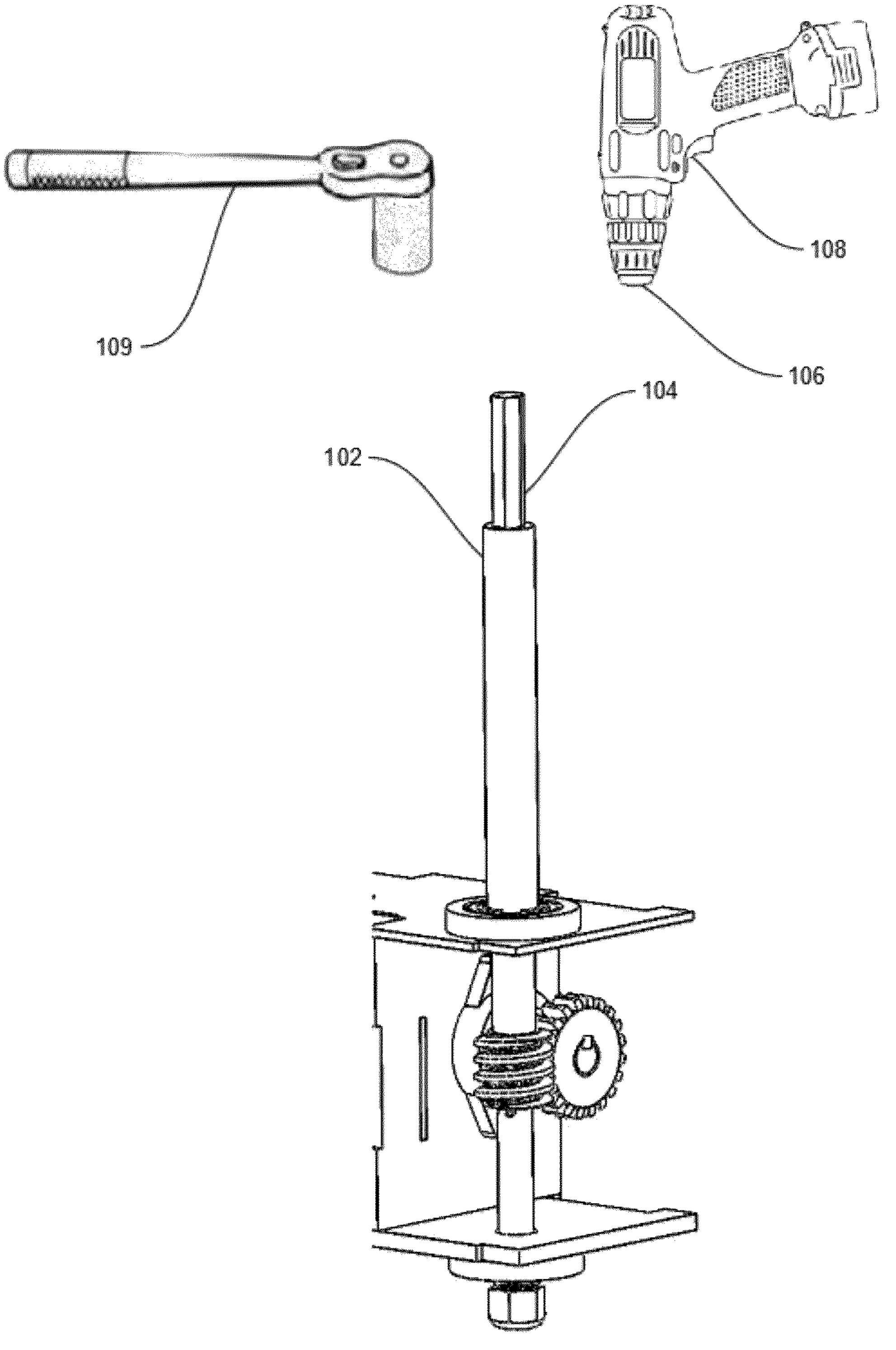
FIG. 5 is a schematic showing the parts needed for the motive force.

As shown in FIG. 5, the proximal end 102 of the spindle has a hexagonal shaped section 104 that engages a drill bit 106 of a drill 108, which is preferably cordless. The drill 108 is handheld by the user and provides the motive force for the chain drive. Alternately, a socket wrench 109 may be used to engage the spindle to provide motive force.

Figure 6A:
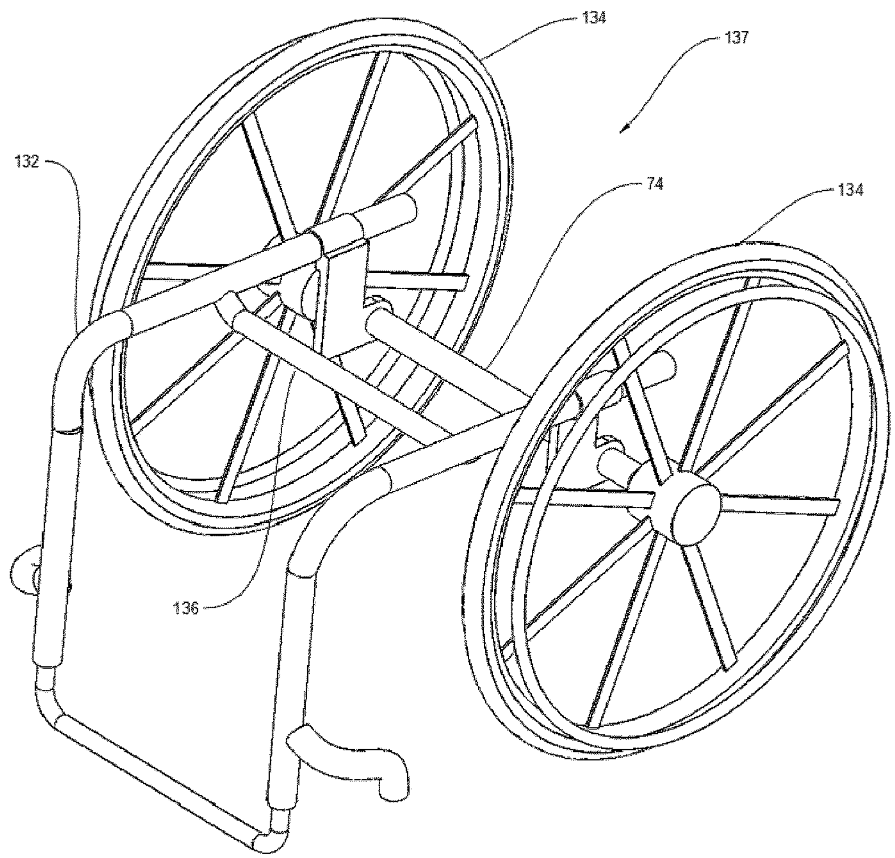
FIG. 6A is a top perspective view of a wheelchair without a seat.

FIG. 6A shows a wheelchair frame 132, two wheels 134, a center axle 74, and a horizontal support member 136. The front casters, backrest, and seat of the wheelchair have been omitted for visual clarity, but their inclusion is assumed for the normal function of the wheelchair, generally referred to as 137.

Figure 6B:
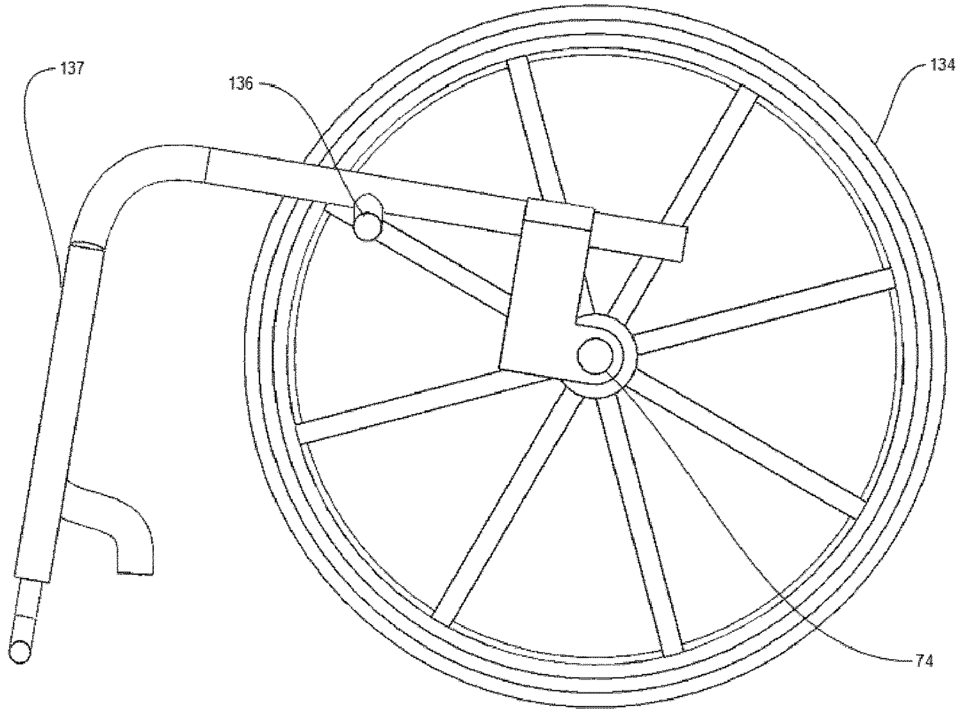
FIG. 6B is a side view of the wheelchair without the seat.

FIG. 6B shows a side view of a wheelchair also showing a wheelchair frame 132, the wheels 134, the center axle 74, and a horizontal support member 136.

Figure 7:
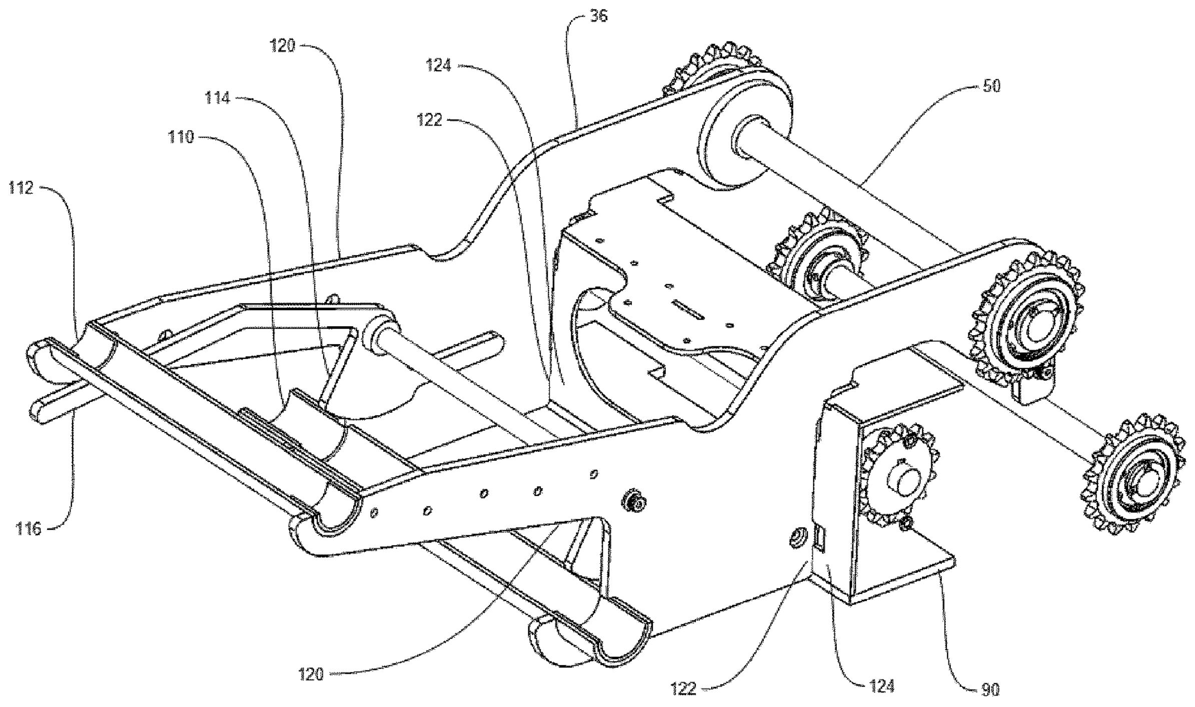
FIG. 7 is a perspective view of the carriage of the lift device of FIG. 1.

As shown in FIG. 7, the carriage 36 has an axle support 110 that is a groove for accepting the axle of the wheelchair. A horizontal member 112 is also grooved and is for accepting the horizontal member 136 on the wheelchair. The axle support has a locking mechanism 114. A release lever 116 is attached to the locking mechanism 114 allowing the user to release the locking mechanism 114. The locking mechanism is sprung to favour a clockwise orientation such that the release lever 116 rests against the bottom of the horizontal member 112 and the locking mechanism 110 favours the locked position. A pair of arms 120 of the carriage 36 are rotatably mounted on the upper idler axle 50. The back 122 of the carriage 36 rests on the front 124 of the gear box 90 in the working horizontal position. When the user is finished with the device 10, the carriage can be moved to the vertical storage position.

The method of a user in a wheelchair 137 autonomously raising and lowering the wheelchair from a ground position to a raised position is shown in FIGS. 8A-8E. To engage the wheelchair lift device 10, the user then backs the wheelchair towards the carriage 36 until the wheelchair axle 74 engages the locking mechanism 114 such that the locking mechanism 114 rotates to the open state. The user then raises the carriage until the axle support 110 contacts the wheelchair axle 74. This action will allow the locking mechanism 114 to assume the locked position and forcibly contain the wheelchair axle 74 against the axle support 110. The raising of the carriage 36 will also cause the wheelchair horizontal member 136 to be positioned within the horizontal support member 112.

As shown in FIG. 8A, a user backs their wheelchair, generally referred to as 137, towards the carriage, general referred to as 36. A locking mechanism 114 with a release lever 116 is rotatably attached to the carriage 36.

FIG. 8B shows the axle 74 of the wheelchair 137 engaging the locking mechanism 114 such that the release lever 116 is in a lowered orientation.

FIG. 8C shows the carriage 36 raised such that the axle 74 of the wheelchair 137 is engaged by the axle support 110 and the horizontal member 126 of the wheelchair 137 is engaged by the horizontal member 112. The locking mechanism 114 engages the axle 74 in a locked position. The release lever 116 is shown in its raised orientation.

FIG. 8D shows the user actuating the chain drive with the drill 108, while sitting in the wheelchair 137.

FIG. 8E shows the wheelchair 137 in an elevated position. In this position the sections of the chains 70 that are above the driver sprockets 68 and below the upper securing point 72 hold the weight of the wheelchair 137 while there is no appreciable tension in the section of chains 70 leading to the lower idler sprockets 66 and the securing point on the base rear member 24.

As shown in FIG. 8F, the user and wheelchair 137 can be lifted to at least 36 inches above the surface that the wheelchair wheels had been on. As the drill 108 is a variable speed drill 108, the user can raise and lower the wheelchair 132 at any chosen speed and to any chosen height. This allows for accurate positioning of the user and wheelchair 132.

As shown in FIG. 8G, when the device 10 is stowed off the ground underneath the wheelchair 137, the chain tension reverses and only the weight of the device 10 is felt via tension on the lower section of the chains 70 between the driver sprockets 68 and securing point on the base rear member 24. A caster wheel 71 is attached to the carriage 36 and acts as a tipping prevention device in the event that the weight of the user is not sufficient to overcome the weight of the lifted device 10. The user may choose to allow the wheelchair 137 to tip backwards such that the caster wheel 71 engages with the floor while transporting the device from location to location with wheelchair 137.

FIG. 9A shows the lift device 10 prepared for moving after the user has finished using the device 10. The legs 28,30 and the carriage 36 are folded. The legs 28,30 are retained in the folded position with leg clips 29 mounted on the gear box 90. The user can tilt the lift device 10 onto the caster wheels and roll it around to a storage location.

FIG. 9B shows the carriage 36 of device 10 locked in its storage state.

FIG. 10A shows the right leg 28 in its deployed state. Both the right leg 28 and the left leg 30 of the device 10 operate in similar fashions. Using the right leg 28 as an example, the leg 28 has a proximal section 134 which is considered stationary and a distal section 136 that is rotatably located inside the stationary proximal section 134 of leg 28. A detent pin 138 is deployed into a hole 140 of the stationary section 134 of the leg 28. The detent pin 138 prevents the rotation of the distal section 136 with respect to the proximal section 134 of the leg 28. A slide screw 142 is secured to the distal section 136 through the rotation slot 144 of the proximal section 134. A second detent pin 146 is deployed into a hole 148 of the stationary section 134 of leg 28. This detent pin 36 prevents the proximal section 136 from rotating about Bolt 150.

FIG. 10B shows the right leg 28 in its storage state. The distal section 136 of leg 28 has been rotated 180 degrees about the central axis about the proximal section 134 of the leg 28. The slide screw 142 and the rotation slot 144 prevent the distal section 136 of the leg 28 to rotate past 180 degrees. The detent pin 146 has also been disconnected from hole 148 allowing the distal section 136 of the leg 28 to rotate upwards about the bolt 150.

FIG. 11A shows the carriage 36 of the device 10 in its operational position. A latching hook 152 is rotatably attached to the carriage 36. The latching hook 152 engages a receiving slot 154 on the front face 124 of the gearbox 90 such that the carriage is locked in its horizontal operational position. The latching hook 152 can be rotatably disengaged from the receiving slot 154 so that the carriage 36 can be moved to its storage position.

FIG. 11B shows the carriage 36 of the device 10 in its storage position. A latching hook 156 is rotatably attached to the carriage 36. The latching hook 156 engages the top edge 158 of the gearbox 90 such that the carriage is locked in its vertical storage position. The latching hook 156 can be rotatably disengaged from the top edge 158 of the gearbox 90 so that the carriage 36 can be moved to operational position.

In an alternative embodiment, the handheld cordless power tool is a power socket wrench, and the spindle has a hexagonal end for being accepted by the power socket wrench.

In another alternative embodiment, the bit of the handheld tool is a socket bit, and the spindle has a hexagonal bore for accepting the bit.

In another alternative embodiment, the bit of the handheld tool is a Torx® bit and the spindle has a star-shaped bore for accepting the bit.

In another alternative embodiment, the bit of the handheld tool is a spline bit, and the spindle has a 12 point star-shaped bore for accepting the bit.

In another embodiment, the power tool is a handheld power socket wrench, which includes a cord.

In another embodiment, the power tool is a handheld drill, which includes a cord.

In another embodiment, the device is operated by an attached electric motor that is battery powered.

In another embodiment, the device is operated by an attached electric motor that includes a cord.

In another embodiment, the drivetrain comprises pulleys and belts rather than sprockets and chains.

In another embodiment, the drivetrain comprises of a rack and pinion gearing system rather than sprockets and chains.

In another embodiment the drivetrain comprises of a power screw system rather than sprockets and chains.

In yet another embodiment, the V-groove guides are replaced with guides such as, but not limited to tubes or U-shaped guides and the sheaves are replaced with rollers, such as but not limited to concave rollers or convex rollers.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A wheelchair lift for use with a handheld power tool, the wheelchair lift comprising: a framework, which includes a base, a top and a pair of sides, wherein the sides include V-groove guides; a pair of articulating legs mounted on the base; a carriage, which includes a plurality of sheaves that engage the V-groove guides and including a grooved axle support which is configured to accept a wheelchair axle; a drivetrain in motive relation with the carriage; a gear box which is attached to the carriage; a gear box gear which is housed in the gear box and is in motive relation with the drivetrain; and a spindle which is attached to the gear box gear, extends outward from the gear box and is configured to engage with a bit of the handheld tool.

2. The wheelchair lift of claim 1, wherein the drivetrain includes a plurality of chains, an upper idler sprocket on an upper idler axle, a middle driver sprocket on a driver axle which is in motive relation with the gear box gear and a lower idler sprocket on a lower idler axle.

3. The wheelchair lift of claim 2, wherein the carriage is rotatably mounted on the lower idler axle and is moveable from a horizontal working position to a vertical storage position.

4. The wheelchair lift of claim 3, wherein the spindle includes a hexagonal proximal end.

5. The wheelchair lift of claim 4, further comprising a locking mechanism on the carriage, which is configured to lock the carriage to a wheelchair axle.

6. A system for raising and lowering a wheelchair and user, the system comprising a handheld tool with a bit and a lift comprising: a framework, which includes a base, a top and a pair of sides wherein the sides include V-groove guides; a pair of articulating legs mounted on the base; a carriage, which includes a plurality of sheaves that engage the V-groove guides and including a grooved axle support which is configured to accept a wheelchair axle; a drivetrain in motive relation with the carriage; a gear box which is attached to the carriage; a gear box gear which is housed in the gear box and is in motive relation with the drivetrain; and a spindle which is attached to the gear box gear, extends upward from the gear box and is configured to engage the bit of the handheld tool.

7. The system of claim 6, wherein the handheld tool is a power drill.

8. The system of claim 7, wherein the handheld power drill is cordless.

9. The system of claim 6, wherein the handheld tool is a socket wrench.

10. The system of claim 9, wherein the drivetrain includes a plurality of chains, an upper idler sprocket on an upper idler axle, a middle driver sprocket on a driver axle which is in motive relation with a gear in the gear box and a lower idler sprocket on a lower idler axle.

11. The system of claim 10, wherein the carriage is rotatably mounted on the lower idler axle and is moveable from a horizontal working position to a vertical storage position.

12. The system of claim 11, wherein the spindle includes a hexagonal proximal end.

13. The system of claim 12, further comprising a locking mechanism on the carriage, which is configured to lock the carriage to a wheelchair axle.

14. A method of a user in a wheelchair autonomously raising and lowering the wheelchair from a ground position, the method comprising: the user selecting the system of claim 6 for raising and lowering the wheelchair; the user positioning the wheelchair over the lifting device; the user engaging the bit of the hand tool with the lifting device; the user actuating the lift with the hand tool by rotating the bit; the lift engaging an axle of the wheelchair and raising the wheelchair; the user stopping the lift at a raised position by stopping the rotation of the bit; the user lowering the wheelchair to the ground position by actuating the lift with the hand tool by counter rotating the bit, thereby autonomously raising and lowering the wheelchair.

15. The method of claim 14, further comprising the user locking the wheelchair to the lift prior to raising the wheelchair.

16. The method of claim 15, wherein the actuating is effected by a power handheld tool.

17. The method of claim 16, wherein the actuating is effected by a cordless drill.

* * * * *